United States Patent
Rohwer et al.

(10) Patent No.: US 8,161,994 B2
(45) Date of Patent: Apr. 24, 2012

(54) MULTIPLE PHASE TRANSFER VALVE FOR LIQUID HYDROGEN TANK

(75) Inventors: Thorsten Rohwer, Tamm (DE); Dieter Kaimann, Mainz (DE)

(73) Assignee: GM Global Technology Operations LLC, Detroit, MI (US)

(*) Notice: Subject to any disclaimer, the term of this patent is extended or adjusted under 35 U.S.C. 154(b) by 400 days.

(21) Appl. No.: 12/048,302

(22) Filed: Mar. 14, 2008

(65) Prior Publication Data
US 2009/0229692 A1 Sep. 17, 2009

(51) Int. Cl.
*G05D 11/03* (2006.01)
(52) U.S. Cl. ................................ 137/112; 137/111
(58) Field of Classification Search .......... 137/111, 137/112, 113, 114; 251/25; 62/50.7
See application file for complete search history.

(56) References Cited

U.S. PATENT DOCUMENTS

| | | | |
|---|---|---|---|
| 3,099,290 A * | 7/1963 | Chatham et al. | 137/607 |
| 3,556,124 A * | 1/1971 | Walton | 137/112 |
| 4,463,735 A | 8/1984 | Stoltman | |
| 4,729,406 A * | 3/1988 | Frentzel | 137/624.14 |
| 6,634,178 B1 | 10/2003 | Michel et al. | |
| 6,953,028 B2 * | 10/2005 | Bingham et al. | 123/527 |
| 2006/0196565 A1 * | 9/2006 | Pechtold | 137/625.44 |

FOREIGN PATENT DOCUMENTS

| | | |
|---|---|---|
| DE | 3933393 | 4/1991 |
| DE | 19546617 | 6/1997 |
| DE | 19817448 | 10/1999 |
| DE | 19934457 | 2/2001 |
| DE | 102006009060 | 9/2006 |

* cited by examiner

*Primary Examiner* — Craig Schneider
*Assistant Examiner* — Kevin Murphy
(74) *Attorney, Agent, or Firm* — BrooksGroup

(57) ABSTRACT

A product comprising a phase transfer valve, and wherein said phase transfer valve comprises an actuating valve housing having a housing interior; a liquid hydrogen inlet, a gaseous hydrogen inlet and a hydrogen outlet provided in said valve housing; an actuating valve slidably mounted in said housing interior; and wherein said actuating valve is moveable between a first position for sealing said gaseous hydrogen inlet from said hydrogen outlet and a second position for sealing said liquid hydrogen inlet from said hydrogen outlet.

9 Claims, 2 Drawing Sheets

MULTIPLE PHASE TRANSFER VALVE FOR LIQUID HYDROGEN TANK

TECHNICAL FIELD

The disclosure generally relates to systems for distributing liquid or gaseous hydrogen from a hydrogen storage tank.

BACKGROUND

Hydrogen is commonly used in various industrial applications. For example, in a fuel cell, hydrogen gas is used as a fuel to generate electrical power which operates a vehicle or other machinery. The hydrogen is typically stored in liquid form in a hydrogen tank and distributed in the liquid or gaseous phase from the tank to the fuel cell for use.

The liquid hydrogen storage system currently being used in fuel cell systems must accommodate the following requirements: (1) discharge tubes or lines which distribute liquid and/or gaseous hydrogen from the hydrogen tank; (2) two supply lines for a heater installed in the hydrogen tank; and (3) a fill tube or line. These requirements result in five tubes or lines which exit the hydrogen tank and essentially breach the integrity of the tank's thermal insulation. Currently, it is estimated that about ⅓ of the heat intrusion into the interior of the hydrogen tank is conducted via the required discharge and supply lines.

FIG. 1 illustrates a typical conventional hydrogen tank system 10 which is suitable for use in a fuel cell system. The system 10 includes a hydrogen tank 12 having multiple layers of insulation which define a tank interior 14 that contains a supply of liquid hydrogen 16. A vacuum chamber 18 outside the hydrogen tank 12 contains a gaseous hydrogen discharge valve 20, which facilitates the distribution of gaseous hydrogen from the tank interior 14, and a liquid hydrogen discharge valve 22, which facilitates the distribution of the liquid hydrogen 16 from the tank interior 14.

SUMMARY OF EXEMPLARY EMBODIMENTS OF THE INVENTION

One embodiment of the invention includes a product including a phase transfer valve. The phase transfer valve includes an actuating valve housing having a housing interior, a liquid hydrogen inlet, a gaseous hydrogen inlet and a hydrogen outlet provided in said valve housing and an actuating valve slidably mounted in the housing interior. The actuating valve is moveable between a first position for sealing said gaseous hydrogen inlet from the hydrogen outlet and a second position for sealing said liquid hydrogen inlet from the hydrogen outlet.

BRIEF DESCRIPTION OF THE DRAWINGS

The invention will now be described, by way of example, with reference to the accompanying drawings.

DETAILED DESCRIPTION OF EXEMPLARY EMBODIMENTS OF THE INVENTION

Figure 1:
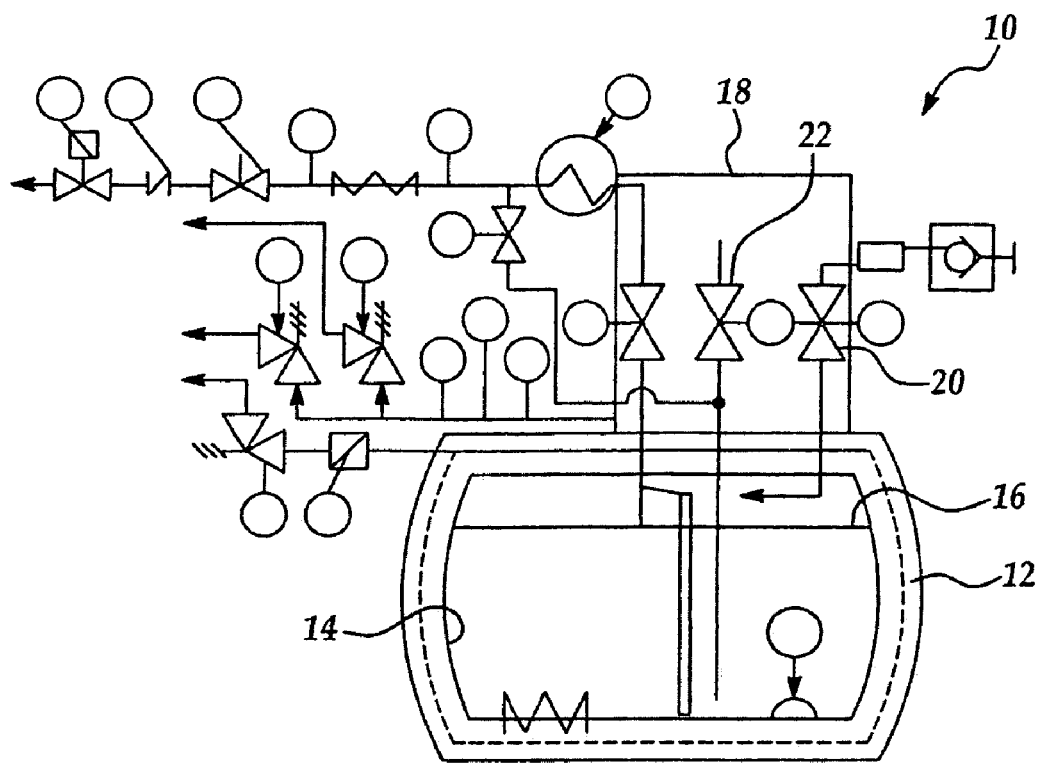
FIG. 1 is a schematic view of a conventional hydrogen tank system suitable for use in a fuel cell system.
Figure 2:
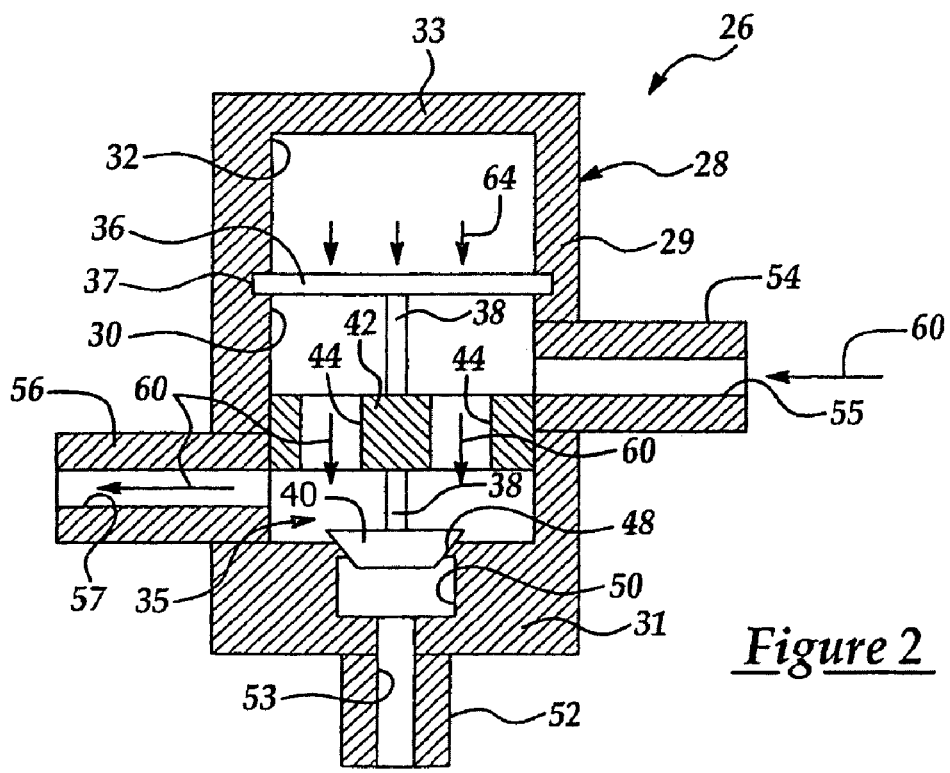
FIG. 2 is a cross-sectional view of a phase transfer valve illustrating sealing of a gaseous hydrogen inlet and flow of liquid hydrogen through the valve and into a hydrogen outlet according to one embodiment of the invention.
Figure 3:
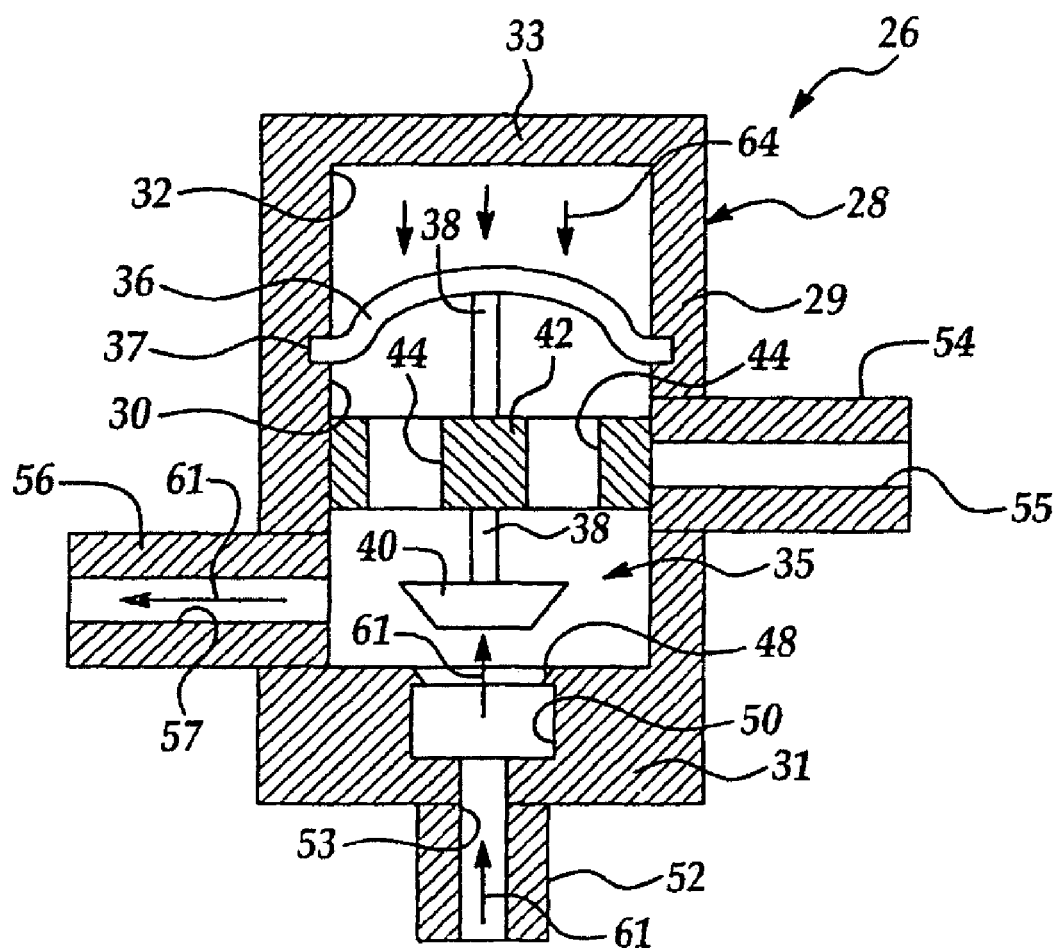
FIG. 3 is a cross-section of the phase transfer valve illustrating sealing of a liquid hydrogen inlet and flow of gaseous hydrogen through the valve and into the hydrogen outlet according to one embodiment of the invention.

Referring to FIGS. 2 and 3, an illustrative embodiment of a multiple phase transfer valve is generally indicated by reference numeral 26. The phase transfer valve 26 is designed to be mounted inside a hydrogen tank (not shown) such as the hydrogen tank 12 heretofore described with respect to FIG. 1. As will be hereinafter described, the phase transfer valve 26 facilitates the automatic distribution of either liquid hydrogen 60 (FIG. 2) or gaseous hydrogen 61 (FIG. 3), depending on the magnitude of hydrogen pressure in the hydrogen tank, from the hydrogen tank to a fuel cell system (not shown) or other destination for use. When the magnitude of the hydrogen in the hydrogen tank exceeds a predetermined reference pressure, the phase transfer valve 26 allows flow of the gaseous hydrogen 60 and prevents flow of the liquid hydrogen 61 from the hydrogen tank. When the magnitude of the hydrogen in the hydrogen tank meets or falls below the predetermined reference pressure, the phase transfer valve 26 prevents flow of the gaseous hydrogen 61 and facilitates flow of the liquid hydrogen 60 from the hydrogen tank.

As shown in FIGS. 2 and 3, the phase transfer valve 26 may include a valve housing 28 with a portion providing a cylindrical housing wall 29, a housing bottom 31 and a housing top 33. It is understood that, when used herein, relative terms such as "bottom" and "top" are used for descriptive purposes only and shall not be construed to limit the possible positions of the phase transfer valve 26 in use thereof. The valve housing 28 is preferably a cryogenic-tolerant polymer material such as Teflon® (tetrahydrofluoroethylene). The housing wall 29, housing bottom 31 and housing top 33 enclose a housing interior 30 and a reference pressure chamber 32. A diaphragm groove 37, the purpose of which will be hereinafter described, is provided in the housing wall 29, between the housing interior 30 and the reference pressure chamber 32.

A liquid hydrogen inlet arm 54 extends from the valve housing 28. A liquid hydrogen inlet conduit 55 extends through the liquid hydrogen inlet arm 54 and housing wall 29 and is disposed in fluid communication with the housing interior 30. The liquid hydrogen inlet arm 54 is typically disposed in spaced-apart relationship to the housing bottom 31. A hydrogen outlet arm 56 extends from the valve housing 28. A hydrogen outlet conduit 57 extends through the hydrogen outlet arm 56 and is disposed in fluid communication with the housing interior 30. The hydrogen outlet arm 56 is typically disposed in immediately adjacent relationship to the housing bottom 31.

A tapered valve seat 48 is provided in the housing bottom 31, between the liquid hydrogen inlet arm 54 and the hydrogen outlet arm 56. A gaseous hydrogen chamber 50 is provided in the housing bottom 31 and communicates with the valve seat 48. A gaseous hydrogen inlet arm 52 extends from the housing bottom 31. A gaseous hydrogen inlet conduit 53 extends through the gaseous hydrogen inlet arm 52 and is disposed in fluid communication with the gaseous hydrogen chamber 50.

An actuating valve 35 is slidably mounted in the housing interior 30. In one embodiment of the invention, the actuating valve 35 includes a flexible diaphragm 36, the edge of which may be inserted and retained in the diaphragm groove 37 according to techniques known to those skilled in the art. The diaphragm 36 establishes a fluid-tight seal between the housing interior 30 and the reference pressure chamber 32. Preferably, the diaphragm 36 is high-grade steel, thin-wave membrane or other suitable rustproof material which is cryogenically stable. Air or other gas is enclosed in the reference pressure chamber 32 and applies to the diaphragm 36 a predetermined reference pressure 64 which corresponds to the switch force between distribution of the gaseous hydrogen 61 and the liquid hydrogen 60 from the hydrogen tank, as will be hereinafter further described. The gas in the reference chamber 32 should have a lower boiling point than the filling gas for the storage device. For example, if hydrogen is being stored in the tank, helium should be in the reference chamber 32. If a loaded spring is used to bias the diaphragm, then the reference chamber 32 should be under vacuum.

The actuating valve 35 further includes an elongated valve rod 38 which engages the membrane 36 and traverses the approximate center of the housing interior 30. A tapered valve head 40, which is complementary in configuration to the tapered valve seat 48, is provided on the end of the valve rod 38. The valve head 40 is aligned with the valve seat 48. The valve rod 38 and valve head 40 are a cryogenically-stable material such as high-grade steel, for example. A piston 42, which circumferentially engages the housing wall 29, is mounted on the valve rod 38, between the membrane 36 and the valve head 40, and sealingly engages the interior surface of the housing wall 29 in the housing interior 30. In one embodiment of the invention, at least one, and preferably multiple liquid hydrogen flow openings 44 extend through the piston 42.

As shown in FIGS. 2 and 3, depending on the magnitude of the hydrogen pressure in the hydrogen tank, the actuating valve 35 is movable between a lower position (FIG. 2) and an upper position (FIG. 3) as the piston 42 slides in the housing interior 30. When the actuating valve 35 is in the lower position of FIG. 2, the valve head 40 is firmly seated in the valve seat 48 and the piston 42 clears (unblocks) the liquid hydrogen inlet conduit 55. Therefore, the hydrogen outlet conduit 57 is disposed in fluid communication with the liquid hydrogen inlet conduit 55 through the housing interior 30 and liquid hydrogen flow opening or openings 44 of the piston 42, whereas the hydrogen outlet conduit 57 is sealed off from the gaseous hydrogen inlet conduit 53 by the valve head 40. Conversely, when the actuating valve 35 is in the upper position of FIG. 3, the piston 42 seals the hydrogen outlet conduit 57 from the liquid hydrogen inlet conduit 55, whereas the valve head 40 disengages the valve seat 48 and fluid communication is established between the hydrogen outlet conduit 57 and the gaseous hydrogen inlet conduit 53. That is, the gaseous hydrogen inlet 53 is unblocked by the valve head 40.

In operation of the phase transfer valve 26, the reference pressure gas in the reference pressure chamber 32 applies a reference pressure 64 having a predetermined constant magnitude against the diaphragm 36. The magnitude of the reference pressure 64 is within the operating pressure level range of the hydrogen tank. In the event that the magnitude of the hydrogen pressure inside the hydrogen tank substantially equals the magnitude of the reference pressure 64, the actuating valve 35 is in the upper position shown in FIG. 2. Accordingly, the liquid hydrogen 60 flows from the hydrogen tank through the inlet conduit 55, housing interior 30 and liquid hydrogen flow opening or openings 44 in the piston 42, and into the hydrogen outlet conduit 57, respectively. The hydrogen outlet conduit 57 distributes the liquid hydrogen 60 of the fuel cell (not shown) or other destination for use. Simultaneously, the valve head 40, which is seated in the valve seat 48, prevents gaseous hydrogen 61 (FIG. 3) from flowing from the gaseous hydrogen inlet conduit 53 and into the hydrogen outlet conduit 57.

In the event that the magnitude of the hydrogen pressure in the hydrogen tank increases (due to an increase in temperature, for example) beyond the magnitude of the reference pressure 64 applied against the diaphragm 36, the liquid hydrogen 60 applies an upward force against the diaphragm 36 such that the diaphragm 36 deforms into the reference pressure chamber 32, as shown in FIG. 3. This causes the diaphragm 36 to lift the valve rod 38, or allows the valve rod 38 to move upward which raises the piston 42 upwardly in the housing interior 30 such that the piston 42 blocks the outlet of the liquid hydrogen inlet conduit 55 and therefore prevents further flow of the liquid hydrogen 60 from the inlet conduit 55 and into the housing interior 30. Simultaneously, the valve head 40 is raised from the valve seat 48 such that fluid communication is established between the gaseous hydrogen inlet conduit 53 and the hydrogen outlet conduit 57. Accordingly, the gaseous hydrogen 61 flows from the gaseous hydrogen inlet conduit 53 and through the gaseous hydrogen chamber 50, unsealed valve seat 48 and housing interior 30, respectively; and into the hydrogen outlet conduit 57. The hydrogen outlet conduit 57 distributes the liquid hydrogen 60 to the fuel cell (not shown) or other destination for use.

As the gaseous hydrogen 61 continues to flow from the gaseous hydrogen inlet conduit 53, through the valve housing 28 and into the hydrogen outlet conduit 57, the magnitude of the hydrogen pressure in the hydrogen tank steadily decreases. Accordingly, when the magnitude of the hydrogen pressure in the hydrogen tank becomes equal to and exceeds the reference pressure 64 applied against the diaphragm 36, the reference pressure 64 pushes downwardly against the diaphragm 36 to deform the membrane 36 back to the original position shown in FIG. 2. The diaphragm 36, in turn, pushes the valve rod 38 downwardly, such that the piston 42 slides downwardly in the housing interior 30 and clears the liquid hydrogen inlet conduit 55, as shown in FIG. 2. Simultaneously, the valve head 40 is seated in the valve seat 48. Accordingly, the valve head 40 prevents further flow of gaseous hydrogen 61 from the gaseous hydrogen inlet conduit 53 through the valve housing 28 and into the hydrogen outlet conduit 57, whereas flow of the liquid hydrogen 60 from the liquid hydrogen inlet conduit 55, through the valve housing 28 and liquid hydrogen flow opening or openings 44 of the piston 42, respectively, into the hydrogen outlet conduit 57 is resumed.

In one embodiment of the invention, the diaphragm 36 constitutes a biasing means for biasing the valve head 40 and piston 42 toward a first position. In other embodiments of the biasing means, the diaphragm 36 may be replaced by an elastic material (such as foam) coil spring or leaf spring.

Another embodiment of the invention includes a method of switching between distribution of liquid hydrogen and gaseous hydrogen from a hydrogen tank responsive to an interior tank pressure. The method includes providing a phase transfer valve in the hydrogen tank, subjecting the phase transfer valve to a reference pressure, distributing liquid hydrogen from the hydrogen tank and through the phase transfer valve when the interior tank pressure falls below the reference pressure, and distributing gaseous hydrogen from the hydrogen tank and through the phase transfer valve when the interior tank pressure exceeds the reference pressure.

While the exemplary embodiments of the invention have been described above, it will be recognized and understood that various modifications can be made in the invention and the appended claims are intended to cover all such modifications which may fall within the spirit and scope of the invention.

What is claimed is:

1. A product comprising:
a valve housing having a housing interior having a wall and a liquid hydrogen inlet extending through said wall, a gaseous hydrogen inlet and at least one hydrogen outlet provided in fluid communication with said housing interior;
an actuating valve having a valve head for sealing said gaseous hydrogen inlet from said hydrogen outlet when said actuating valve is in a first position, said actuating valve also having a piston circumferentially sealably engaging said valve housing wall, said piston having at least one liquid flow opening extending through said piston, and where said piston seals said liquid hydrogen inlet from said hydrogen outlet when said actuating valve is in a second position and in the first position the liquid hydrogen inlet, the hydrogen outlet and the liquid flow opening extending through the piston are in fluid communication to allow liquid hydrogen to flow therethrough; and
a diaphragm provided in said housing interior for applying a reference force against said actuating valve for normally biasing said actuating valve in said first position, wherein liquid hydrogen flowing through said liquid hydrogen inlet applies a force acting against said reference force, and wherein, when said force is greater than said reference force, said actuating valve slides to said second position.

2. A product as set forth in claim 1 wherein said valve head has a generally tapered configuration.

3. A product as set forth in claim 1 further comprising an elongated valve rod engaged by said diaphragm and wherein said piston and said valve head are provided on said valve rod.

4. A product as set forth in claim 1 further comprising a housing bottom provided on said valve housing and wherein said gaseous hydrogen inlet is provided in said housing bottom, and further comprising a valve seat provided in said housing bottom in fluid communication with said gaseous hydrogen inlet and wherein said valve head sits on the valve seat and seals said gaseous hydrogen inlet when said actuating valve is in said first position.

5. A product as set forth in claim 4 further comprising a gaseous hydrogen chamber provided in said housing bottom between said gaseous hydrogen inlet and said valve seat.

6. A product as set forth in claim 1 wherein said diaphragm is connected with said actuating valve.

7. A method comprising:
providing a valve housing in a hydrogen tank, said housing having an interior having a wall and a liquid hydrogen inlet extending through said wall, a gaseous hydrogen inlet and at least one hydrogen outlet provided in fluid communication with said housing interior;
providing within said housing an actuating valve having a valve head for sealing said gaseous hydrogen inlet from said hydrogen outlet when said actuating valve is in a first position, said actuating valve also having a piston circumferentially sealably engaging said valve housing wall, said piston having at least one liquid flow opening extending through said piston, and where said piston seals said liquid hydrogen inlet from said hydrogen outlet when said actuating valve is in a second position and in the first position the liquid hydrogen inlet, the hydrogen outlet and the liquid flow opening extending through the piston are in fluid communication to allow liquid hydrogen to flow therethrough;
providing a diaphragm in said housing interior for applying a reference force against said actuating valve for normally biasing said actuating valve to said first position, wherein liquid hydrogen flowing through said liquid hydrogen inlet applies a force acting against said reference force, and wherein, when said force is greater than said reference force, said actuating valve slides to said second position;
distributing liquid hydrogen from said hydrogen tank and through said phase transfer valve when said interior tank pressure falls below said reference pressure; and
distributing gaseous hydrogen from said hydrogen tank and through said phase transfer valve when said interior tank pressure exceeds said reference pressure; and
wherein said interior tank pressure is the only pressure acting against said reference pressure and when said liquid hydrogen inlet is sealed by said piston said liquid hydrogen pressure does not provide an axial force on said actuating valve.

8. A product comprising:
a valve housing having a housing interior having a wall and a liquid hydrogen inlet extending through said wall, a gaseous hydrogen inlet and at least one hydrogen outlet provided in fluid communication with said housing interior;
an actuating valve having a valve head for sealing said gaseous hydrogen inlet from said hydrogen outlet when said actuating valve is in a first position, said actuating valve also having a piston circumferentially sealably engaging said valve housing wall, said piston having at least one liquid flow opening extending through said piston, and where said piston seals said liquid hydrogen inlet from said hydrogen outlet when said actuating valve is in a second position; and
a diaphragm provided in said housing interior and an enclosed reference pressure chamber defined in the housing and having a gas therein that applies to the diaphragm a predetermined force so that the diaphragm applies a reference force against said actuating valve for normally biasing said actuating valve in said first position, wherein liquid hydrogen flowing through said liquid hydrogen inlet applies a force acting against said reference force, and wherein, when said force is greater than said reference force, said actuating valve slides to said second position.

9. A method comprising:
providing a valve housing in a hydrogen tank, said housing having an interior having a wall and a liquid hydrogen inlet extending through said wall, a gaseous hydrogen inlet and at least one hydrogen outlet provided in fluid communication with said housing interior;
providing within said housing an actuating valve having a valve head for sealing said gaseous hydrogen inlet from said hydrogen outlet when said actuating valve is in a first position, said actuating valve also having a piston circumferentially sealably engaging said valve housing wall, said piston having at least one liquid flow opening extending through said piston, and where said piston seals said liquid hydrogen inlet from said hydrogen outlet when said actuating valve is in a second position;
providing a diaphragm in said housing interior and an enclosed reference pressure chamber defined in the housing and having a gas therein that applies to the diaphragm a predetermined force so that the diaphragm applies a reference force against said actuating valve for normally biasing said actuating valve to said first position, wherein liquid hydrogen flowing through said liquid hydrogen inlet applies a force acting against said reference force, and wherein, when said force is greater than said reference force, said actuating valve slides to said second position;

distributing liquid hydrogen from said hydrogen tank and through said phase transfer valve when said interior tank pressure falls below said reference pressure; and distributing gaseous hydrogen from said hydrogen tank and through said phase transfer valve when said interior tank pressure exceeds said reference pressure; and wherein said interior tank pressure is the only pressure acting against said reference pressure and when said liquid hydrogen inlet is sealed by said piston said liquid hydrogen pressure does not provide an axial force on said actuating valve.

* * * * *